United States Patent [19]

Kleewein et al.

[11] Patent Number: 5,930,793

[45] Date of Patent: Jul. 27, 1999

[54] PERFORMANCE OPTIMIZATION IN A HETEROGENEOUS, DISTRIBUTED DATABASE ENVIRONMENT

[75] Inventors: James C. Kleewein; Eileen T. Lin, both of San Jose; Yun Wang, Saratoga, all of Calif.

[73] Assignee: International Business Machines Corporation, Armonk, N.Y.

[21] Appl. No.: 08/959,676

[22] Filed: Oct. 29, 1997

Related U.S. Application Data

[63] Continuation of application No. 08/462,845, Jun. 5, 1995, Pat. No. 5,768,577, which is a continuation of application No. 08/314,643, Sep. 29, 1994, abandoned.

[51] Int. Cl.⁶ .................................................. G06F 15/173
[52] U.S. Cl. ................................. 707/10; 707/2; 707/4; 395/200.31; 395/200.53; 395/200.57
[58] Field of Search ........................... 707/2, 4, 10, 102, 707/200; 395/200.31, 200.53, 200.57

[56] References Cited

U.S. PATENT DOCUMENTS

| 4,714,989 | 12/1987 | Billings | 364/200 |
|---|---|---|---|
| 4,714,995 | 12/1987 | Materna et al. | 364/200 |
| 4,769,772 | 9/1988 | Dwyer | 707/10 |
| 4,881,166 | 11/1988 | Thompson et al. | 364/200 |
| 5,046,002 | 9/1991 | Takashi et al. | 364/200 |
| 5,058,000 | 10/1991 | Cox et al. | 364/200 |
| 5,142,470 | 8/1992 | Bristow et al. | 364/184 |
| 5,161,158 | 11/1992 | Chakravarty et al. | 371/15.1 |
| 5,239,577 | 8/1993 | Bates et al. | 379/201 |
| 5,247,664 | 9/1993 | Thompson et al. | 395/600 |
| 5,257,366 | 10/1993 | Adair et al. | 395/600 |
| 5,278,978 | 1/1994 | Demers et al. | 395/600 |
| 5,301,302 | 4/1994 | Blackard et al. | 395/500 |
| 5,345,587 | 9/1994 | Fehskens et al. | 395/650 |
| 5,381,534 | 1/1995 | Shi | 395/200 |
| 5,452,450 | 9/1995 | Delory | 707/10 |
| 5,561,797 | 10/1996 | Gilles et al. | 395/600 |
| 5,581,749 | 12/1996 | Hossain et al. | 395/600 |
| 5,581,758 | 12/1996 | Burnett et al. | 395/614 |
| 5,630,124 | 5/1997 | Coyle, Jr. et al. | 707/103 |

OTHER PUBLICATIONS

Arbee L.P. Chen, *A Localized Approach to Distributed Query Processing*, Bell Communications Research, Piscataway, N.J., Mar. 26, 1990, pp. 188–202.

S.M. Deen et al., "Query Decomposition in PRECI*," Distributed Data Sharing Systems, Elsevier Science Publishers B.V. (North Holland), pp. 91–103, 1985.

M. Rusinkiewicz et al., "Query Transformation in Heterogeneous Distributed Database Systems," *IEEE*, pp. 300–307, 1985.

T. Yu Clement et al., "Query Processing in a Fragmented Relational Distributed System: Mermaid," *IEEE Trans. on Software Engineering*, vol. SE–11, No. 8, pp. 795–810, Aug. 1985.

M. Rusinkiewicz et al., "An Approach to Query Processing in Federated Database Systems," *Proc. of the Twentieth Annual Hawaii Intl' Conf. on System Sciences*, pp. 430–440, 1987.

S. Kang et al., "Global Query Management in Heterogeneous Distributed Database Systems," *Microprocessing and Microprogramming*, vol. 38, pp. 377–384, 1993.

Primary Examiner—Paul V. Kulik
Assistant Examiner—Jean R. Homere
Attorney, Agent, or Firm—Merchant, Gould, Smith, Edell, Welter, & Schmidt

[57] ABSTRACT

The performance of a heterogeneous, distributed database system is optimized by supporting both block fetch operations and positioned update operations. Specifically, a data block is fetched from a target database management system (DBMS), and a positioned update instruction issued by a client is processed. The positioned update instruction, when executed by the target DBMS, enables the target DBMS to modify a row contained in the data block and addressed by a cursor as the cursor is perceived by the client. Also, performance of the database system is optimized by identifying database statements that reference invariant host variables, and modifying such database statements by replacing in the database statements the host variables with literal values equivalent to the host variables.

6 Claims, 6 Drawing Sheets

PERFORMANCE OPTIMIZATION IN A HETEROGENEOUS, DISTRIBUTED DATABASE ENVIRONMENT

CROSS-REFERENCE TO OTHER APPLICATIONS

This Application is a continuation of and commonly assigned patent application of application Ser. No. 08/462,845, now U.S. Pat. No. 5,768,577, entitled PERFORMANCE OPTIMIZATION IN A HETEROGENEOUS, DISTRIBUTED DATABASE ENVIRONMENT, filed Jun. 5, 1995, by James C. Kleewein et al., which is a continuation application of application Ser. No. 08/314,643, entitled PERFORMANCE OPTIMIZATION IN A HETEROGENEOUS, DISTRIBUTED DATABASE ENVIRONMENT, filed Sep. 29, 1994, by James C. Kleewein et al., which has been abandoned.

The following applications of common assignee contain some common disclosure.

- U.S. Patent Application Ser. No. 08/638,209, filed Apr. 26, 1996, U.S. Pat. No. 5,596,748, issued Jan. 21, 1997, entitled "Functional Compensation In a Heterogeneous, Distributed Database Environment", U.S. Ser. No. 08/314,644, Sep. 29, 1994, pending.
- U.S. Patent Application Ser. No. 08/310,799, filed Sep. 29, 1994, U.S. Pat. No. 5,764,949, issued Jun. 9, 1998, entitled "Pass Through In a Distributed Multi-Database System", U.S. Ser. No. 08/310,799, filed Sep. 29, 1994, pending.
- U.S. Patent Application Ser. No. 08/310,797, filed Sep. 23, 1994, U.S. Pat. No. 5,588,150, issued Feb. 24, 1996, entitled "Push Down Optimization in a Distributed, Multi-Database System", U.S. Ser. No. 08/310,797, filed Sep. 29, 1994, now U.S. Pat. No. 5,588,150.

The above-listed applications are incorporated herein by reference in their entireties.

DESCRIPTION

1. Technical Field

The present invention relates generally to computer database systems, and more particularly to performance optimization in a heterogeneous, distributed database environment.

2. Background Art

In modern data processing environments, a client's data is often distributed among a plurality of heterogeneous database systems (more precisely, a client's data is distributed among a plurality of database instances which were instantiated from different database management systems). "Heterogeneous database systems" are database systems that have different data definition and manipulation procedures, security procedures, system management approaches, capabilities, etc. Examples of "heterogeneous database systems" include DB2 produced by International Business Machines (IBM) Corporation, Oracle produced by Oracle Corp., Sybase produced by Sybase Inc., etc. Such heterogeneous database systems, when used together, collectively represent a heterogeneous, distributed database environment (or system). Heterogeneous, distributed database systems are also sometimes called federated database systems and/or multi-database systems.

In order to enhance user-friendliness, it is preferred that clients be provided with a common interface to all of the heterogeneous database systems (heterogeneous database systems to which a client is not directly connected are called back-end database systems, or simply back-ends). In other words, it is preferred that clients be under the illusion that they are interacting with a single database system.

One conventional approach for achieving this goal is to introduce an interface module between the clients and the back-end database systems. This interface module, also called database middleware or data access middleware, attempts to provide to clients transparent access to the back-end database systems. Generally speaking, the interface module receives data definition and manipulation instructions from clients. The interface module translates these instructions such that they are understandable to the appropriate back-end database systems, and then transfers the translated instructions to the appropriate back-end database systems. Similarly, the interface module translates information and messages received from the back-end database systems such that they are understandable to the appropriate clients, and then transfers the translated information and messages to the appropriate clients.

Performance is a critical attribute of heterogeneous, distributed database systems. Accordingly, any performance optimization procedures achieved by an interface module will result in enhancing the overall performance of the associated database system. Some conventional interface modules do not operate to optimize performance at all. Other conventional interface modules attempt to optimize performance, but such attempts are either incomplete or not entirely effective.

Thus, what is needed are improved procedures for optimizing performance in a heterogeneous, distributed database environment.

SUMMARY OF THE INVENTION

Briefly stated, the present invention is directed to a system and method for optimizing performance of a database system wherein data associated with a client is distributed among a plurality of heterogeneous database management systems. Performance of the database system is optimized by supporting both block fetch operations and positioned update operations. Specifically, in the present invention, block fetch and positioned update are not mutually exclusive. In conventional database systems, block fetch (that is, fetching a data block comprising two or more records from a target database management system, DBMS) and positioned update (that is, modifying or deleting a record identified by the current position of the cursor as the cursor is perceived by the client) are mutually exclusive because the cursor position as perceived by the client differs from the cursor position as perceived by the target DBMS. In the present invention, block fetch and positioned update are not mutually exclusive.

Also, performance of the database system is optimized by identifying database statements that reference invariant host variables, and modifying such database statements by replacing in the database statements the host variables with literal values equivalent to the host variables.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF DRAWINGS

The present invention will be described with reference to the accompanying drawings, wherein.

DETAILED DESCRIPTION

1. Overview of the Present Invention

For illustrative purposes, the present invention is sometimes described herein using well known SQL concepts, statements, and syntax. As will be appreciated, SQL (structured query language) is a well known database language originally developed by International Business Machines (IBM) Corporation, and now supported by many relational database vendors, and defined by various standards bodies, such as the American National Standards Institute (ANSI). It should be understood, however, that reference is made to SQL for convenience purposes only. The present invention is intended and adapted to operate with database management systems which do not support SQL.

Figure 1:
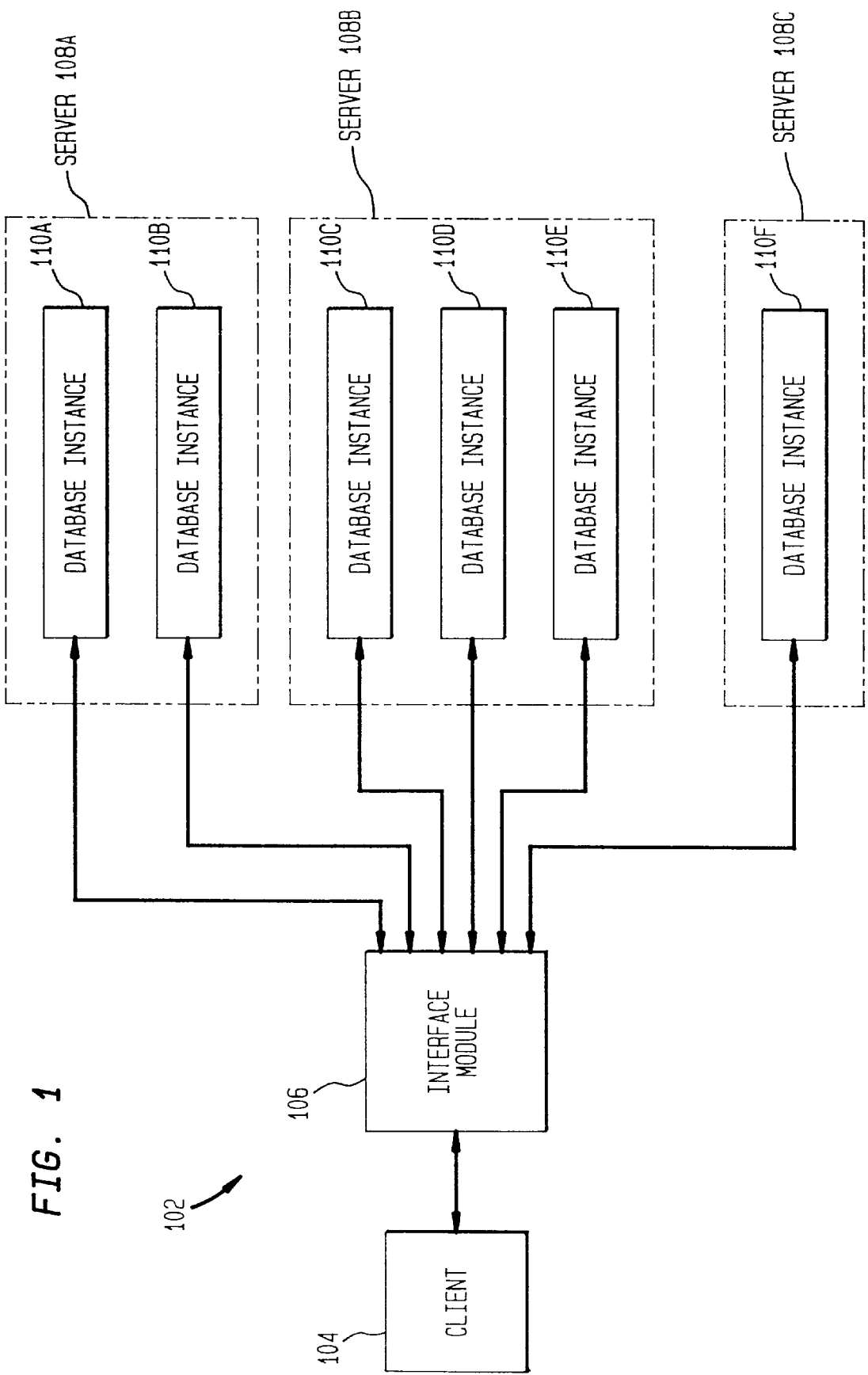
FIGS. 1 and 2 are block diagrams of a heterogeneous, distributed database system according to a preferred embodiment of the present invention.

FIG. 1 is a block diagram of a heterogeneous, distributed database system 102 according to a preferred embodiment of the present invention. The heterogeneous, distributed database system 102 includes one or more client application processes (also called, simply, "clients"), collectively represented by client 104.

Client 104 is connected to a plurality of instances of back-end database management systems (DBMS) (such as database instances 110A–110F) via an interface module 106. The database instances 110A–110F represent instantiations of a plurality of heterogeneous database management systems, such as DB2 produced by International Business Machines (IBM) Corporation, Oracle produced by Oracle Corp., Sybase produced by Sybase Inc., as well as other relational DBMS. Such heterogeneous database management systems may also include non-relational DBMS, flat files, etc.

The database instances 110A–110F execute on a plurality of servers, such as servers 108A–108C. In the example of FIG. 1, database instances 110A and 110B execute on server 108A, database instances 110C, 110D, and 110E execute on server 108A, and database instance 110F executes on server 108F.

The interface module 106 provides clients 104 with a common interface to all of the database instances 110A–110F (i.e., all of the back-end database systems). By operation of the interface module 106, the clients 104 are placed under the illusion that they are interacting with a single back-end database system.

The interface module 106 of the present invention implements techniques for optimizing performance in the heterogeneous, distributed database system 102. The interface module 106 and, in particular, the manner in which the interface module 106 performs such performance optimization techniques, are discussed in detail below.

2. Preferred Structure of the Present Invention

Figure 2:
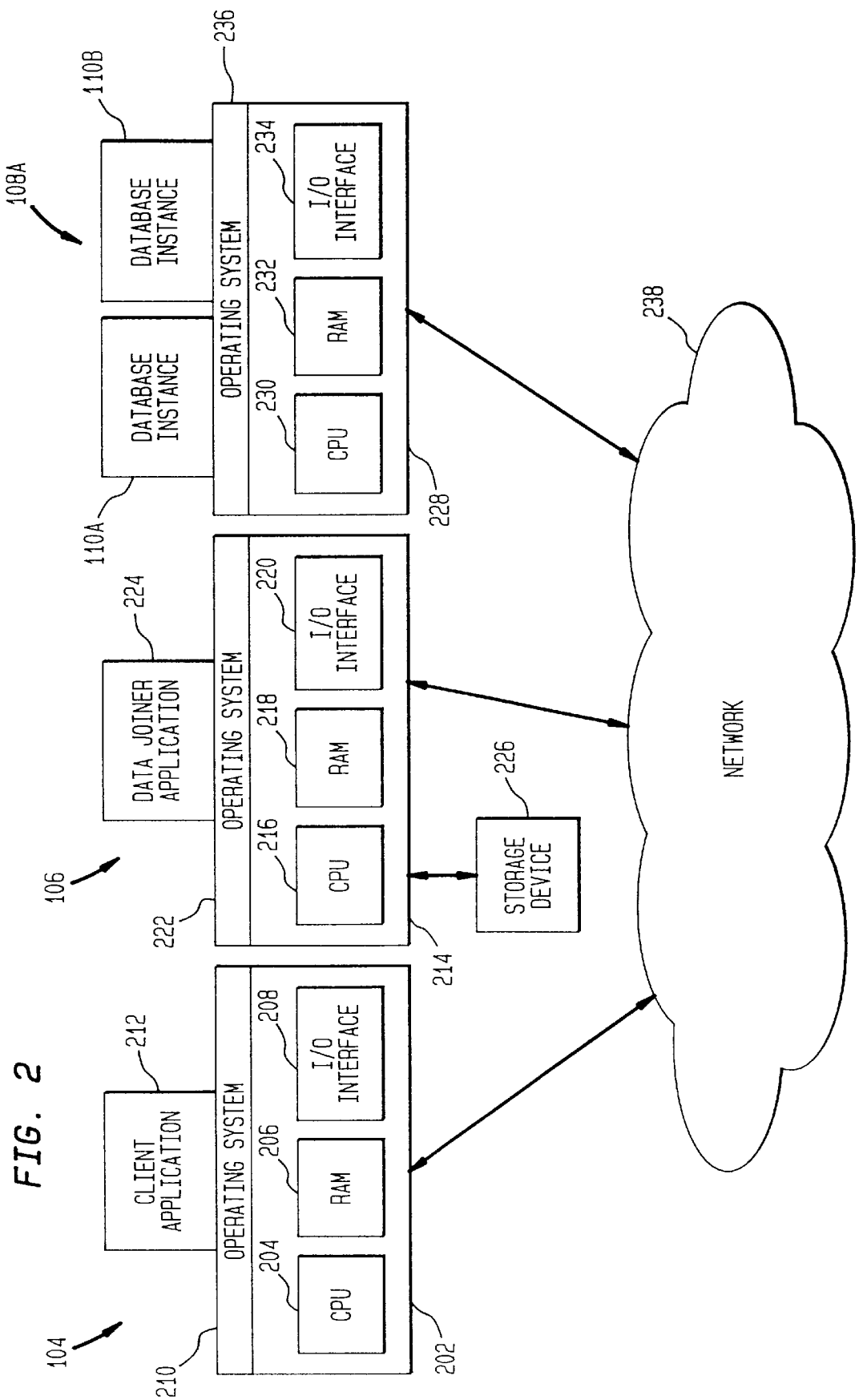

Referring to FIG. 2, the client 104 is preferably implemented as a client application program 212 operating on a computer platform comprising a computer 202 and an operating system 210. The computer 202 includes various hardware components, such as one or more central processing units (CPU) 204, a random access memory (RAM) 206, and an input/output (I/O) interface 208. The client application program 212 includes instructions for defining and manipulating data in databases maintained by the database instances 110A–110F. The operating system 210 may be implemented using any well known operating system suitable for executing the client application program 212, such as DOS, DOS/Windows, AIX, OS/2, HP-UX, and Sun OS. The computer 202 may be implemented using any well known computer that supports these operating systems. It should be understood, however, that other computers and operating systems could alternatively be used without departing from the scope and spirit of the present invention.

The interface module 106 is preferably implemented as a data joiner application program 224 (preferably written in the C computer programming language) operating on a computer platform comprising a computer 214 and an operating system 222. The data joiner application program 224, when executed, enables the computer 214 to perform the features of the interface module 106 discussed herein. Thus, the data joiner application program 224 could be considered a controller of the computer 214.

The computer 214 includes various hardware components, such as one or more central processing units (CPU) 216, a random access memory (RAM) 218, and an input/output (I/O) interface 220.

Preferably, the computer 214 is from the well known RISC System/6000 family of computers produced by IBM. Alternatively, the computer 274 is any computer that can run DB2 (produced by IBM). The operating system 222 is preferably the well known AIX operating system produced by IBM. It should be understood, however, that other computers and operating systems could alternatively be used without departing from the scope and spirit of the present invention.

The computer 214 is connected to a number of peripheral devices, such as one or more storage devices. The storage devices may represent floppy drive units, hard drive units, tape backup units, etc. One such storage device, designated using reference number 226, is shown in FIG. 2.

A computer program product comprising a computer readable media having computer program logic recorded thereon, wherein the computer program logic when executed in the computer 214 enables the computer 214 to perform the functions of the present invention, may be read by and/or stored on the storage device 226. The computer program logic may then be loaded into the RAM 218, and executed by the CPU 216 of the computer 214. When executing in the CPU 216, the computer program logic is represented by the data joiner application program 224 as shown in FIG. 2.

As stated above, the database instances 110A–110F execute on a plurality of servers 108A–108C. Server 108A is shown in FIG. 2 (servers 108B and 108C are similar to server 108A). The server 108A is preferably implemented as a computer platform comprising a computer 228 and an operating system 236. The computer 228 includes various hardware components, such as one or more central processing units (CPU) 230, a random access memory (RAM) 232, and an input/output (I/O) interface 234. The operating system 236 may be implemented using any well known operating system suitable for executing the database instances 110A and 110B, such as MVS, VM, VSE, OS/400, OS/2, AIX, HP-UX, SUN OS, etc. The computer 228 may be implemented using any well known computer that supports these operating systems. It should be understood, however, that other computers and operating systems could alternatively be used without departing from the scope and spirit of the present invention.

The computers 202, 214, and 228 are connected to a communication network 238, which may be implemented as a local area network (LAN) or a wide area network (WAN), for example. It should be understood, however, that other types of networks, such as a metropolitan area network (MAN), could alternatively be used without departing from the scope and spirit of the present invention. The client 104, interface module 106, and database instances 110A–110F communicate with each other over this network 238.

3. Transparent Block Fetch

Significant performance advantages can be achieved in a heterogeneous, distributed database system if the interface module 106 retrieves data from the database instances 110A–110F in blocks (each block comprising a plurality of rows, or records), rather than one row at a time. Such operations are called block fetch operations.

Retrieving data in blocks reduces the costs associated with communicating between the interface module 106 and the database instances 110A–110F. That is, by retrieving data in blocks, the per row cost of communication is reduced, since communication costs are paid on a block basis, rather than a row basis.

It is important to understand that, while the interface module 106 may retrieve data from the database instances 110A–110F in blocks, the client 104 may process such data one row at a time. Thus, the block fetch operations performed by the interface module 106 are transparent to the client 104.

Some database management systems support positioned update operations. A positioned update operation is one where the record being updated is the one pointed to by the cursor. As is well known, a cursor is a window into a database table. A cursor can be viewed as a pointer to the rows in a table.

Conventionally, block fetch operations and positioned update operations have been mutually exclusive. Conventional database management systems support either one or the other, but not both. For example, consider FIG. 5, which illustrates a portion of an example table. This table includes rows A1–A8. The cursor is currently pointing at row A1. Assume that the interface module 106 fetches the next block from the appropriate data instances, and that each block includes five rows. In this case, the interface module 106 would fetch rows A1–A5, and the cursor would advance to row A6 (this is shown in FIG. 6).

Figure 5:
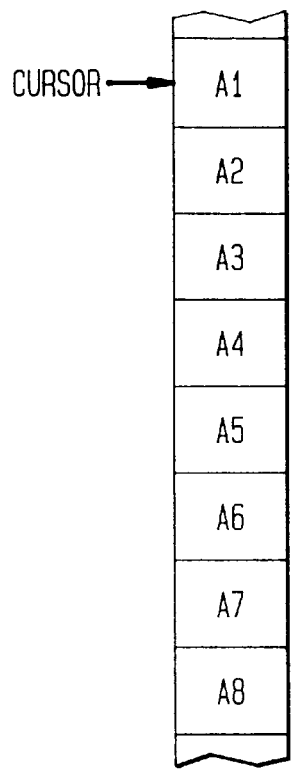
FIGS. 5 and 6 depict example database tables and are used to describe the operation of the present invention.
Figure 6:
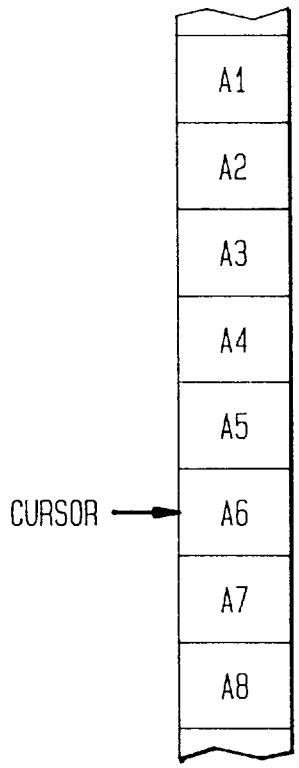

Also assume that the client 104 is processing the table shown in FIGS. 5 and 6 one row at a time. For example, the client 104 may be executing a loop wherein one row of the table is processed during each iteration of the loop. Assume that, sometime after the block fetch operation has completed (and remember that the client 104 is unaware of this block fetch operation), the client 104's processing of the table is such that it (i.e., the client 104) believes that the cursor is pointing at row A3. Now assume that the client 104 wishes to perform a positioned update operation. Clearly, this positioned update operation will not correctly execute, since the client 104 believes that the cursor is pointing at row A3, when in fact it is pointing at row A6. As shown by this example, block fetch operations and positioned update operations have been, in the past, mutually exclusive.

Figure 7:
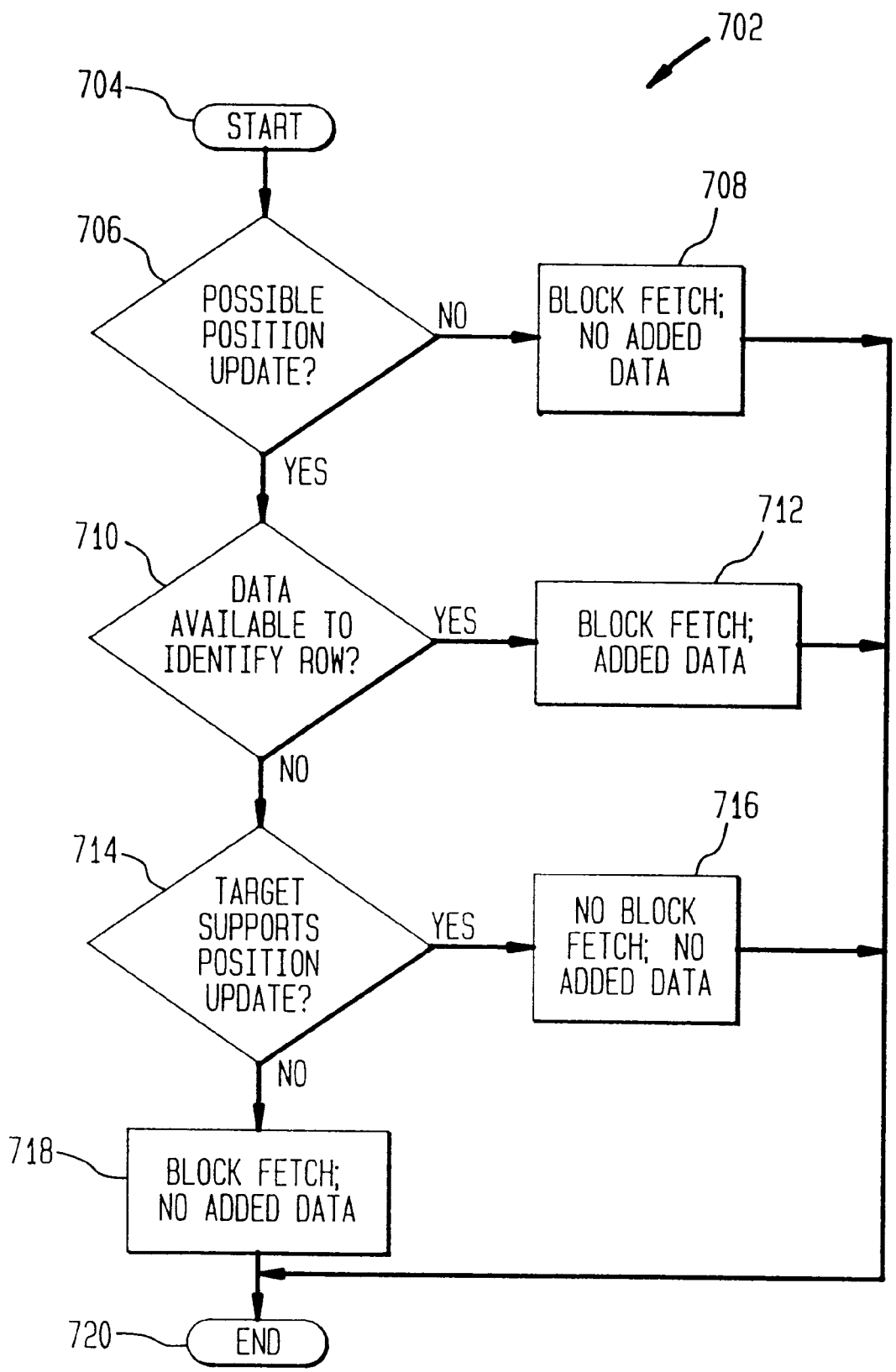

According to the present invention, the interface module 106 supports both block fetch operations and positioned update operations, where the block fetch operations are transparent to clients 104. Flowchart 702 in FIG. 7 depicts the manner in which the interface module 106 fetches data from a target database management system (DBMS). As will be explained, sometimes the interface module 106 fetches data in blocks, and other times the interface module 106 fetches data one row at a time. Flowchart 702 (and all flowcharts contained herein) is of sufficient detail to enable one skilled in the relevant art to generate a computer program or a computer program product in accordance with the present invention. Flowchart 702 begins with step 704, where control immediately passes to step 706.

In step 706, the interface module 106 determines whether there is a possible positioned update operation associated with the cursor in question, and whether this cursor is ambiguous (the "cursor in question" is the cursor with which a data fetch is being performed). If the cursor does not have a positioned update operation associated with it, and the cursor is not ambiguous, then step 708 is performed, wherein the interface module 106 performs a block fetch from the target DBMS. The interface module 106 does not fetch row identifying data in step 708, since such data is not needed in this case.

If it is determined in step 706 that the cursor has a possible positioned update operation associated with it, or the cursor is ambiguous, then step 710 is performed. In step 710, the interface module 106 determines whether data is available in the target DBMS which uniquely identifies the rows to be fetched in the block fetch operation. If such information is available, then step 712 is performed. In step 712, the interface module 106 performs a block fetch from the target DBMS. Additionally, the interface module 106 retrieves from the target DBMS information which uniquely identifies the rows that were fetched during the block fetch operation.

The row identifying information obtained in step 712 may comprise the unique record numbers (also called row identifiers) of the records being fetched. If the target DBMS provides such row identifiers to the interface module 106, then the target DBMS is said to support externalized row identifiers.

Not all database management systems, however, support externalized row identifiers. When operating with such database management systems, the interface module 106 relies on other data to unique identify the record being updated.

Preferably, the interface module 106 accesses metadata pertaining to the table in question (i.e., the table containing the record being updated) to identify primary keys defined for the table. As is well known, such metadata represents data pertaining to the data in tables, and includes information such as the number of fields in each record, the name of each field, the data type and precision (if applicable) of each field, the indexes defined for the table, etc. Such metadata also contains information that identifies the primary keys defined for the table. As is well known, the data contained in a primary key field is unique for each record.

Thus, the interface module 106 in step 710 accesses metadata pertaining to the table in question to identify primary keys, if any, defined for the table (the interface module 106 performs this task in step 710 to determine whether unique row identifying information is available). Then, the interface module 106 in step 712 accesses the target DBMS and retrieves information contained in one or more of the primary key fields for the record being updated. This retrieved information uniquely identifies the record being updated. For example, in a table containing employee information, the interface module 106 may retrieve data from a Social Security Number primary key field from the record being updated.

If it is determined in step 710 that data is not available in the target DBMS which uniquely identifies the rows to be fetched in the block fetch operation, then step 714 is performed. In step 714, the interface module 106 determines whether the target DBMS supports positioned update operations. If the target DBMS supports positioned update operations, then step 716 is performed. In step 716, the interface module 106 fetches data one row at a time. The interface module 106 does not perform a block fetch. By not performing a block fetch, it is guaranteed that the cursor position as viewed by the client is the same as the cursor position as viewed by the target DBMS, such that positioned update operations will be correctly performed.

If it is determined in step 714 that the target DBMS does not support positioned update operations, then step 718 is performed. In step 718, the interface module 106 fetches a block of data, and does not fetch row identifying information. Since the target DBMS does not support positioned update operations, then any attempts by the client to performed a positioned update operation will be rejected by the target DBMS. Thus, there is no harm, and only performance benefits, in fetching a block of data. The operation of flowchart 702 is complete after the performance of any of steps 708, 712, 716, or 718, as indicated by step 720.

Figure 3:
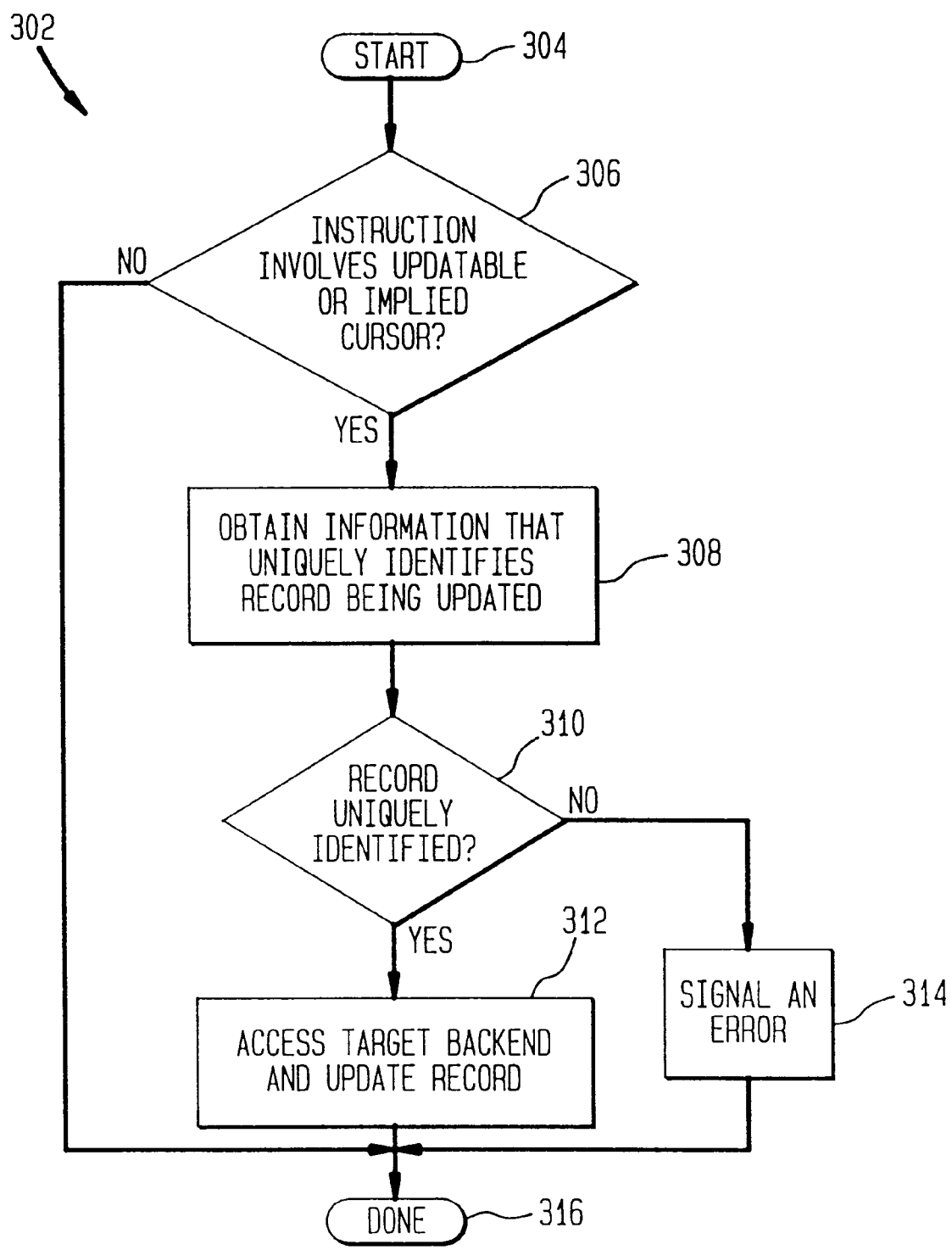
FIGS. 3, 4, and 7 are flowcharts depicting the operation of the present invention.

Flowchart 302 in FIG. 3 depicts the manner in which the interface module 106 processes positioned update operations after a block fetch operation has been performed. The interface module 106 performs the steps of flowchart 302 to process each statement that is issued by the client 104 after the interface module 106 has performed a block fetch operation. Accordingly, the steps of flowchart 302 are not performed if step 716 of flowchart 702 was performed, since no block fetch was performed in step 716. In this case (i.e., step 716 was performed), any positioned update operations are processed using conventional procedures.

Flowchart 302 begins with step 304, where control immediately passes to step 306.

In step 306, the interface module 106 receives a statement issued by the client 104 and determines whether the statement involves an updatable cursor or an implied cursor (implied cursors are also called ambiguous cursors). Consider, for example, the following positioned update instruction:

delete where C1 is currently located

This instruction operates to delete the row pointed to by cursor C1. Cursor C1 is said to be an "updatable cursor", since an update operation (in this case, a positioned update operation) is performed on the row that it is pointing to.

The following is an example of an ambiguous cursor:

declare cursor C1 for select name from emp declare cursor C2 for statement2 open C1 while data fetch C1 prompt user for statement2 prepare statement2 execute statement2 end

In the above, there is a cursor C1 which does not appear to have an associated positioned update operation (hence it appears to be read only). However, we do not know what statement 2 is until the user enters it, and the user may enter a different statement for each iteration of the loop. This statement entered by the user may be a positioned update operation using cursor C1; however, it need not be. Accordingly, cursor C1 is ambiguous.

If it is determined in step 306 that the statement does not involve an updatable cursor or an implied cursor, then processing of flowchart 302 is complete, as indicated by step 316. In this case, the instruction does not represent a positioned update operation. Thus, the interface module 106 need not perform further processing for the purpose of reconciling the instruction with the previously-performed block fetch operation. It is noted that the instruction would not involve an updatable cursor or an implied cursor if step 708 in flowchart 702 was performed.

If, instead, it is determined in step 306 that the statement does involve an updatable cursor or an implied cursor, then step 308 is performed. In this case, the instruction represents a positioned update operation, such that the interface module 106 must perform further processing for the purpose of reconciling the instruction with the previously-performed block fetch operation (assuming that a block fetch operation was performed; this would not be the case if step 718 was performed).

In step 308, the interface module 106 obtains information from the target database management system that uniquely identifies the record that is being updated by the positioned update statement. As discussed above, the client 104's perception of where the cursor is currently located differs from the actual position of the cursor. The "record being updated by the positioned update statement" is the record that is addressed by cursor as the cursor is perceived by the client 104. The "target database management system" is the data instance which maintains the table containing the record that is being modified by the positioned update statement. The information obtained in step 308 represents the information that the interface module 106 obtained in step 712 (assuming, of course, that step 712 was performed).

In step 310, the interface module 106 determines whether it was able in step 308 to obtain information that uniquely identifies the record being updated. The interface module 106 would not have been able to obtain information that uniquely identifies the record being updated if, for example, step 712 was not performed, but rather step 718 was performed.

If it is determined that information was obtained that uniquely identifies the record being updated, then the interface module 106 in step 312 accesses the target DBMS and modifies the record in accordance with the positioned update instruction. In accessing the target DBMS in this manner, the interface module 106 uniquely identifies the record by using the row identification information obtained in step 308.

If, instead, it is determined that information was not obtained that uniquely identifies the record being updated, then the interface module 106 in step 314 signals an error, indicating that it was not possible to perform the positioned update instruction. Step 314 is performed only if step 718 in flowchart 702 was performed.

Operation of flowchart 302 is complete after performing steps 312 or 314, as indicated by step 316. The above actions are performed automatically by the interface module 106, such that support of positioned update operations and block fetch operations is transparent to users and clients.

Although the interface module 106 has been described in the context of a heterogeneous, distributed database system, it should be understood that the underlying principles of the invention as described above apply to other types of database systems where positioned update operations and block fetch operations have been conventionally considered mutually exclusive.

4. Textual Replacement of Query Invariants

A host variable is a variable in a client application program (in a host computer language such as C, Fortran, Cobol, Assembler, etc.) that is referred to in a database statement, such as a SQL statement. Host variables are so named because they are defined by statements of the host language.

For example, consider Code Segment 1, which is part of the client application program 212. It is written in pseudocode that is based on the SQL database language. Line numbers are provided to the left of each statement for reference purposes.

1 for i=1 to 3
2 insert into number_table values(i)
3 end for
Code Segment 1

In Code Segment 1, i is a host variable. The effect of the statement in line 2 is to store the value of i into the table "number_table" during each iteration of the "for" loop, such that the following values are stored in "number_table": 1, 2, 3.

In some situations, the value of a host variable is invariant. That is, the value of a host variable does not change. In such case, the performance of the database system 102 can be optimized by replacing the host variable with the literal value of the host variable.

For example, consider Code Segment 2, which is part of the client application program 212. It is written in pseudocode that is based on the SQL database language. Line numbers are provided to the left of each statement for reference purposes.

1 j=5
b 2 for i=1 to 3
3 insert into number_table values(j)
4 end for
Code Segment 2

In Code Segment 2, the host variable "j" is invariant, since its value is always 5. The performance of the database system 102 can be optimized by modifying the statement at line 3 such that the host variable "j" is textually replaced with its literal value of "5".

By textually replacing host variable invariants with their literal values, it is possible to make better access path selections. This results in optimizing the performance of the data system 102. Such textual replacement of host variable invariants with their literal values also operates to optimize the performance of the data system 102 for other reasons. For example, fewer interactions with the target DBMS result by textually replacing host variable invariants with their literal values. Normally, a statement to a target is identified (this is one interaction), and then non-constant input is identified (one interaction per host variable). By reducing the number of host variables, the number of interactions are reduced, thereby improving performance.

Also, by textually replacing host variable invariants with their literal values, less data is flowed to the target DBMS. Typically, a statement is identified to the target with some indication in that statement of the host variable. Then, host variables are flowed to the target for each invocation of that statement. By reducing the host variables, the information that flows to the target is reduced. This reduces the cost of flowing that information, thereby improving performance.

Figure 4:
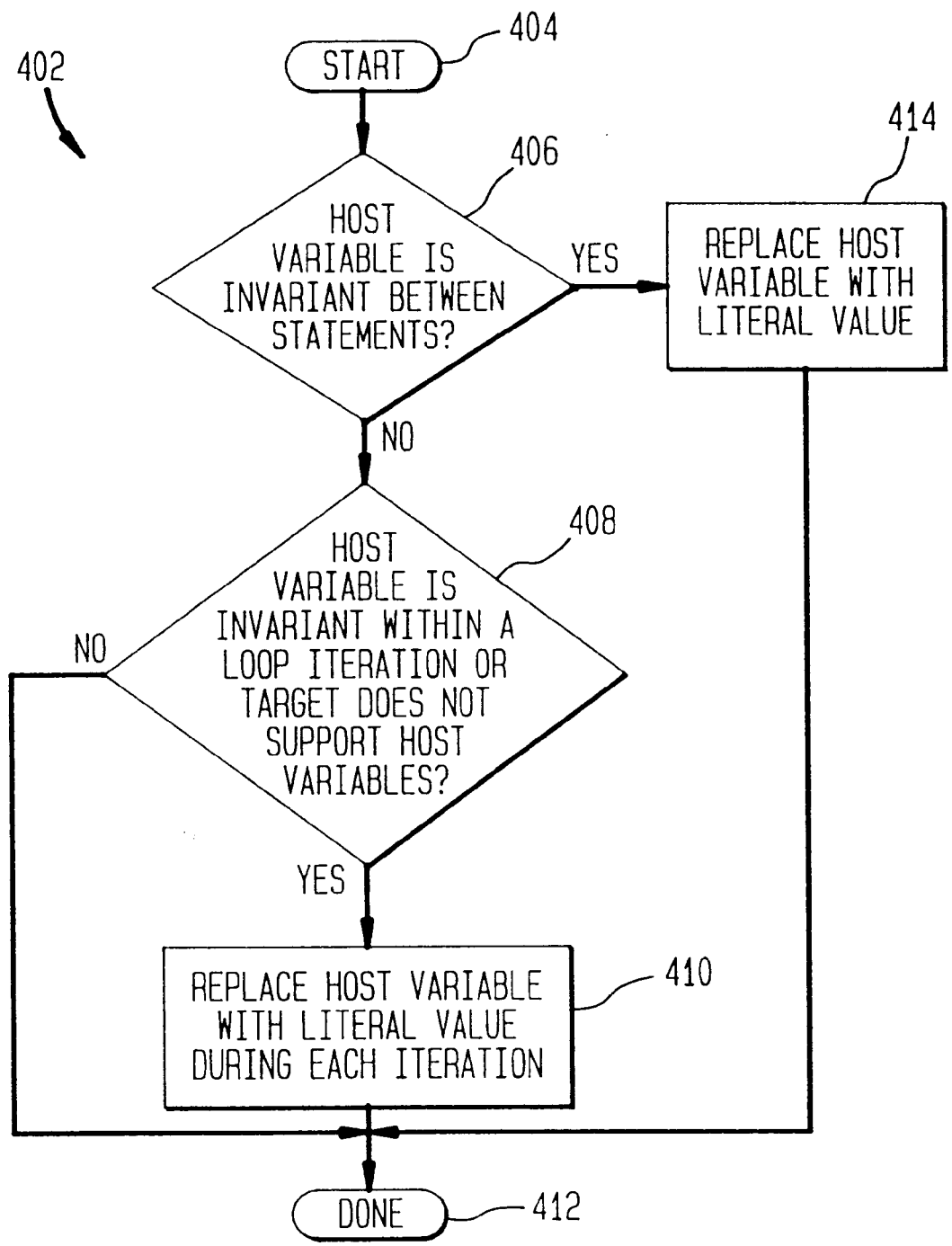

The interface module 106 of the present invention textually replaces host variable invariants with their literal values. Flowchart 402 in FIG. 4 represents the operation of the interface module 106 when performing this function. The steps of flowchart 402 are performed for each host variable in each statement that contains one or more host variables. Flowchart 402 begins with step 404, where control passes immediately to step 406.

In step 406, the interface module 106 determines whether the host variable is invariant between statements. A host variable is invariant between statements if the value of the host variable is always the same for every statement in the client application program. For example, the host variable "i" in Code Segment 1 is not invariant between statements because its value changes with each iteration of the "for" loop. Consequently, its value is not always the same for every statement (for example, the value of i as seen by the statement at line 2 is different for each iteration of the loop). In contrast, the host variable "j" in Code Segment 2 is invariant between statements because its value is the same for all statements of the program, including all iterations of the "for" loop.

More precisely, a host variable is invariant between statements if: (1) it is declared a constant (such as a literal or a constant in the host language); (2) it is implicitly a constant for the execution of the application (such as a "special register" like CURRENT USER or CURRENT SERVER); or (3) code and data flow analysis indicates that the value of the host variable does not change once it is set. The manner in which the interface module 106 checks for these conditions will be apparent to persons skilled in the relevant art.

If it is determined in step 406 that the host variable is invariant between statements, then the interface module 106 in step 414 replaces the host variable with the literal value of the host variable. If, instead, it is determined in step 406 that the host variable is not invariant between statements, then step 408 is performed.

In step 408, the interface module 106 determines whether the host variable is invariant within a loop iteration (i.e., at the statement level), or whether the target back-end does not support host variables at all. A host variable is invariant within a loop iteration if the value of the host variable is the same for all statements during the duration of each loop iteration. More particularly, a host variable is invariant within a loop iteration if it is a single table statement that does not involve sub-queries. For example, the host variable "i" in Code Segment 1 is invariant within a loop iteration because its value is the same for all statements during the duration of each loop iteration. That is, its value is "1" during the first iteration, "2" during the second iteration, and "3" during the third iteration.

If it is determined in step 408 that the host variable is invariant within a loop iteration, or that the target back-end does not support host variables, then the interface module 106 in step 410 replaces the host variable with the literal value of the host variable during each iteration of the loop. For example, during the first iteration of the loop in Code Segment 1, the interface module 106 replaces "values(i)" with "values(1)" in the statement of line 2. During the second and third iterations, the interface module 106 replaces "values(i)" with "values(2)" and "values(3)", respectively.

If, instead, it is determined in step 408 that the host variable is not invariant within a loop iteration, and that the target back-end supports host variables, then the interface module 106 determines that the host variable cannot (or need not) be replaced with its literal value (that is, optimization cannot be performed). Accordingly, processing involving the host variable is complete, as indicated by step 412.

The above actions are performed automatically by the interface module 106, such that optimization involving host variables is transparent to users and clients.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A program storage device readable by a machine, tangibly embodying a program of instructions executable by the machine to perform method steps for optimizing performance of a database system wherein data associated with a client is distributed among a plurality of heterogeneous database management systems (DBMSs), wherein each of the DBMSs comprise a plurality of records, the method steps comprising:

receiving a request from the client for data from one of the plurality of DBMSs;

determining whether there is a positioned update operation associated with the request; and retrieving a plurality of records from one DBMS of the plurality of DBMSs in response to the request, if it is determined that a positioned update operation is not associated with the request.

2. The program storage device of claim 1, the method steps further comprising:

determining whether information is available in the one DBMS to uniquely identify each record in the one DBMS, if it is determined that a positioned update operation is associated with the request; and retrieving a plurality of records and information to uniquely identify each record from the one DBMS in response to the request, if it is determined that information is available in the one DBMS to uniquely identify each record in the one DBMS.

3. The program storage device of claim 1, the method steps further comprising:

determining whether the one DBMS supports positioned update operations if it is determined that information is not available in the one DBMS to uniquely identify each record; and retrieving a plurality of records from the one DBMS in response to the request, if it is determined that the one DBMS does not support positioned update operations.

4. A computer program for use with a distributed database system comprising a plurality of heterogeneous database management systems (DBMSs) having a plurality of records, wherein data associated with a client is distributed among the heterogeneous DBMSs, the computer program product comprising:

a computer usable medium having a computer readable program code means embodied in the medium for optimizing performance of a heterogeneous, distributed DBMSs, the computer readable program code means comprising:

computer readable first program code means for causing a computer to receive a request from the client for data from one of the plurality of DBMSs;

computer readable second program code means for causing the computer to determine whether there is a positioned update operation associated with the request; and computer readable third program code means for causing the computer to retrieve a plurality of records from one DBMS of the plurality of DBMSs in response to the first program code means, if the second computer code means causes the computer to determine that a positioned update operation is not associated with the request.

5. The computer program product of claim 4, further comprising:

computer readable fourth program code means for causing the computer to determine whether information is available in the one DBMS to uniquely identify each record in the one DBMS, if it is determined that a positioned update operation is associated with the request; and computer readable fifth program code means for causing the computer to retrieve a plurality of records and information to uniquely identify each record from the one DBMS in response to first program code means, if the fourth program code means causes the computer to determine that information is available in the one DBMS to uniquely identify each record in the one DBMS.

6. The computer program product of claim 4, further comprising:

computer readable fourth program code means for causing the computer to determine whether the one DBMS supports positioned update operations if it is determined that information is not available in the one DBMS to uniquely identify each record; and computer readable fifth program code means for causing the computer to retrieve a plurality of records from the one DBMS in response to first program code means, if the fourth program code means causes the computer to determine that the one DBMS does not support positioned update operations.

* * * * *